Nov. 20, 1962 C. D. GARD 3,064,929
AUTOMATIC GUIDANCE SYSTEM
Filed Dec. 22, 1958 2 Sheets-Sheet 1
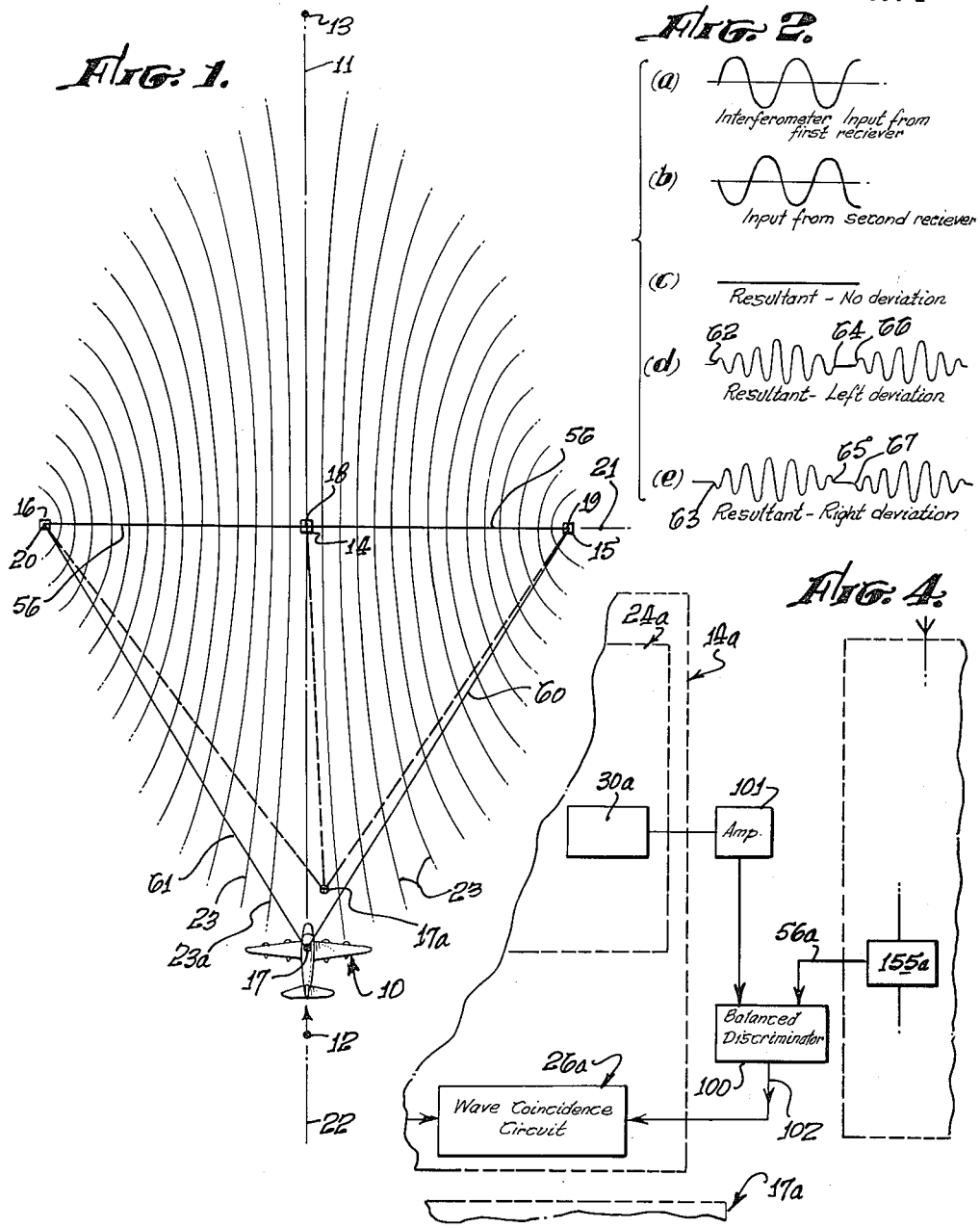
CHARLES DONALD GARD,
INVENTOR.
BY William P. Green
ATTORNEY.

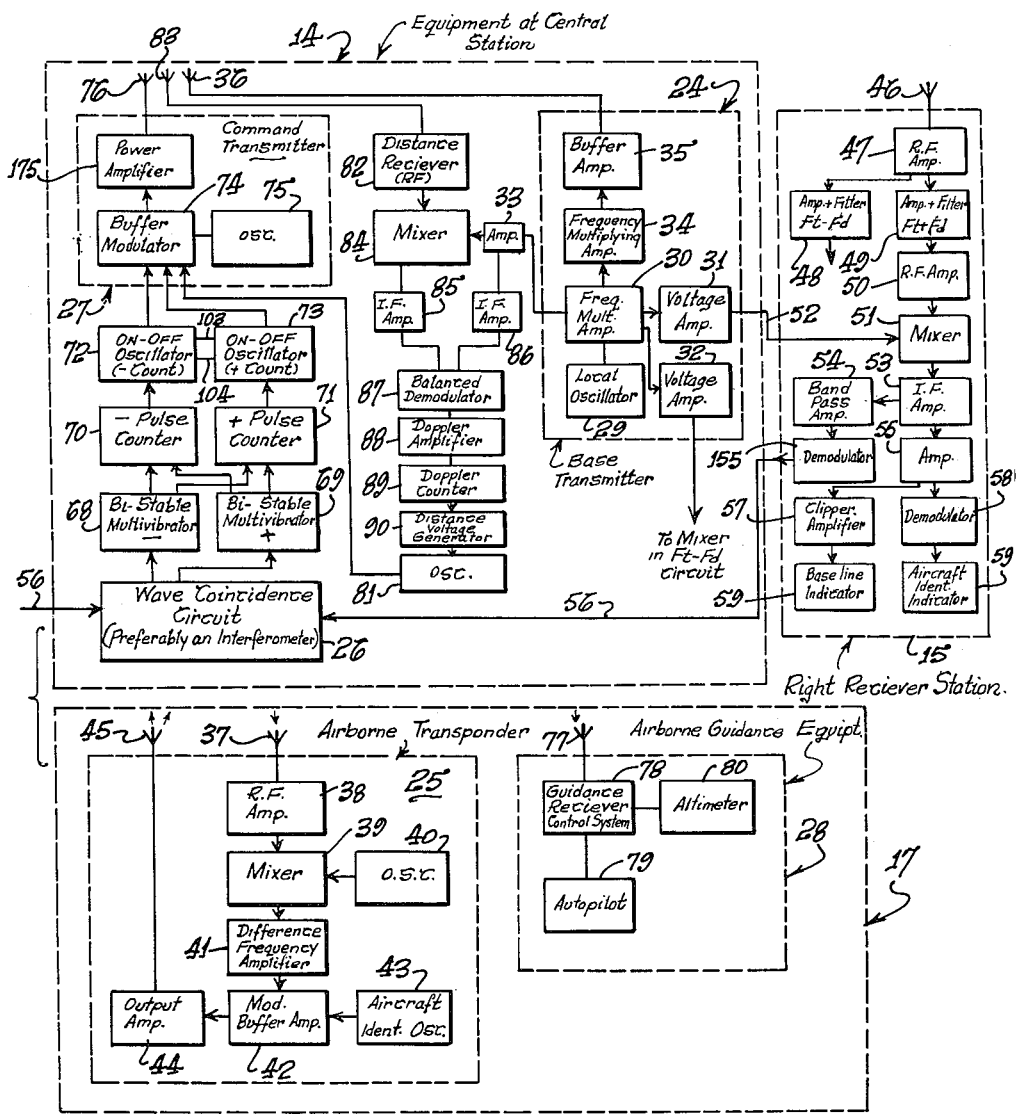

United States Patent Office 3,064,929
Patented Nov. 20, 1962

3,064,929
AUTOMATIC GUIDANCE SYSTEM
Charles Donald Gard, Topanga, Calif., assignor, by direct and mesne assignments, of twenty percent to William P. Green, San Marino, Calif., and eighty percent to John A. Koste, New York, N.Y.
Filed Dec. 22, 1958, Ser. No. 782,216
25 Claims. (Cl. 244—77)

This invention relates to an improved type of guidance system, for directing an airplane, missile, ship or other craft of any type along a predetermined path.

The general object of the invention is to provide a guidance system which can be entirely automatic and instantaneous in operation, so that when a craft deviates either to the right or left of a desired path, the equipment immediately becomes aware of that fact, and automatically generates a corrective command which turns the craft back toward the path. The system is inherently extremely accurate, and by reason of this accuracy of guidance is capable of effectively preventing mid-air collisions such as have occurred all too frequently in recent years.

A particular object of the invention is to provide a guidance system of the above discussed type in which most of the equipment used in the system is mounted on the ground, and only a relatively small part of the apparatus is carried by the craft being guided. In this way, the overall cost of the system is greatly reduced, since the apparatus which must be duplicated for each of the controlled craft is relatively inexpensive.

A system embodying the invention utilizes two receiver stations which are located at opposite sides of the desired guidance path and which receive a common signal of repeating wave form, e.g. a C.W. signal or a repeating pulse signal, transmitted from the moving craft. These two received signals, or two signals derived therefrom or controlled thereby, are fed into a wave coincidence circuit or system, e.g. an interferometer, which is capable of determining whether or not the two waves are or are not in coincidence with one another at a particular time, and which utilizes that information to control corrective guidance commands to the craft. For example, where an interferometer is utilized as the wave coincidence circuit, as is preferred in many applications, the two waves are fed into the interferometer in a relation such as to essentially cancel out one another, and as a result to produce a null or minimum output, when the craft is on the predetermined guidance path. When the craft leaves this path, either to the right or the left, the opposed signals in the interferometer are so relatively displaced that the interferometer produces a very substantial output, which is then utilized to initiate a proper corrective command to be transmitted to the craft. This command automatically causes the craft to turn back toward the path to correct the unwanted deviation.

It is preferred that the signal transmitted from the craft be originally produced or controlled by a base transmitter on the ground, with merely a transponder being provided on the craft for receiving the ground signal and then retransmitting it in altered form to the two ground receivers. The base transmitter desirably has its antenna at a point which is located right in the vertical plane of the predetermined guidance path; and for best operation that antenna and the path are both located midway between the two receiver stations.

The above and other features and objects of the present invention will be better understood from the following detailed description of the typical embodiments illustrated in the accompanying drawings in which:

FIG. 1 is a plan view representation of a first form of guidance system constructed in accordance with the invention, the system being typically represented as applied to the guidance of an aircraft, though it will be apparent from the subsequent description that the system could also be applied to the guidance of any other type of moving craft, such as a ship travelling on a body of water;

FIG. 2 is a representation of the input and output wave forms at the interferometer;

FIG. 3 is a block diagram representation of the electrical circuits in the various pieces of equipment which are utilized in the FIG. 1 system; and FIG. 4 is a block diagram representing a second form of system embodying the invention.

Referring first to FIGS. 1 to 3, and especially to FIG. 1, the invention disclosed therein is designed to guide an aircraft 10 along a predetermined guidance path 11, between a point of departure typically represented at 12 and a point of destination typically represented at 13. As seen in plan view in FIG. 1, the guidance path 11 appears as a straight line between points 12 and 13, indicating that the path always remains within a predetermined vertical plane extending directly vertically upwardly from the surface of the earth. It will of course be appreciated, however, that in actuality the guidance path curves within that vertical plane in correspondence with the curvature of the earth, and also changes in altitude at various points as required to clear mountains and the like, and for takeoff and landing. The present invention is in certain respects particularly concerned with the right and left guidance of craft 10 to keep it in the desired vertical plane which contains path 11.

The equipment utilized in the systems of FIGS. 1 to 3 includes certain apparatus located at a central station 14, two receiver stations 15 and 16 spaced from central station 14, and certain additional equipment 17 carried by and moving with the aircraft 10. The three stations 14, 15 and 16 are all mounted at fixed locations on the ground, so that the geometric positioning of these various stations, that is, the positioning of their antennas, accurately and permanently determines the vertical plane of path 11.

The antennas of the various pieces of equipment located at central station 14 are positioned at a point 18 lying in the vertical guidance plane of path 11. The antennas of the receiver stations 15 and 16 are located at two points 19 and 20 which are spaced equal distances from point 18 and the guidance plane, but are located at opposite sides of point 18 and the vertical guidance plane. The three antenna locations 18, 19 and 20 all preferably lie in a common vertical plane 21 extending directly transversely of the main vertical plane 22 which contains guidance path 11. To define the positioning of the various stations in a somewhat different manner, which has considerable significance in describing the functioning of the system, as will later appear, the path 11 may be considered in plan view as being a degenerate hyperbola, whose two foci are located at the previously mentioned receiver station points 19 and 20. Certain other hyperbolas having their foci at the same points are represented in FIG. 1 at 23, and represent critical locations in space which are accurately defined by the apparatus of the system, and which are utilized for assisting and guiding the aircraft 10 along the desired center path 11. The full significance of these hyperbolic lines 23 will be discussed in greater detail at a later point.

The equipment located at central station 14 includes a base transmitter 24 (see FIG. 3), which transmits an electromagnetic wave signal of regularly repeating wave form, such as a C.W. wave of predetermined frequency, or a regular square pulse wave of a particular frequency. This signal is received on the aircraft by a transponder 25, which then functions to retransmit a signal whose frequency is changed from that of the received signal, but is controlled by and varies in accordance with the frequency of the received signal. This retransmitted signal from the transponder is received at both of the receiver stations 15 and 16, at opposite sides of guidance path 11, but with the received signals being altered to a certain extent as a result of the doppler produced by motion of aircraft 10. In the system of FIGS. 1 to 3, the frequencies of the signals emitted by base transmitter 24 and transponder 25 are preferably so chosen that the change in wave length of the signals resulting in doppler effects constitutes only a very small portion of the base wave lengths involved. For example, the signal emitted from base transmitter 24 may have a frequency of 100 mc./s., while the signal emitted from transponder 25 (without considering doppler effects) may typically be 40 mc./s. The block diagram of the circuit shown in FIG. 3 typically represents an arrangement in which the signal transmitted by the base transmitter 24, and also the signal emitted by transponder 17, are both continuous wave (C.W.) signals, of sine wave configuration. It will be understood, however, that very similar circuits could be employed in which the transmitted signals would be D.C. square pulses, rather than C.W. signals.

After the signal from transponder 25 has been received at the two receiver stations 15 and 16, the signals thus received at the two stations are then fed, in somewhat altered form, into a wave coincidence circuit or system 26 (see FIG. 3), which circuit takes the form of an interferometer when a C.W. type of signal is being employed. In the wave coincidence circuit or interferometer 26, the signals from the two receiver stations 15 and 16 are introduced in opposition to one another, so that when they are exactly in phase they will cancel out, whereas if the two signals shift relatively out of phase, the interferometer has an output. This output is utilized to control a command transmitter 27, which transmits commands to the airborne guidance equipment 28 carried by the aircraft. The actuation of the command transmitter by the interferometer 26 is such that, if the aircraft leaves the desired guidance path 11, either to the right or to the left, a suitable corrective command will automatically be transmitted by transmitter 27 to airborne equipment 28, to turn the craft back in a direction toward path 11.

The base transmitter 24 located at the central station 14 includes a basic local oscillator 29 (see FIG. 3), which very reliably and permanently maintains a predetermined desired C.W. frequency. The output from this oscillator may be fed to a frequency multiplying amplifier 30, to which three voltage amplifiers 31, 32 and 33 are connected to supply oscillator frequencies to various other portions of the apparatus. Another output from frequency multiplying amplifier 30 is fed through a second frequency multiplying amplifier 34, and then through a buffer amplifier 35, to transmitter antenna 36, which is located at the central point 18 of the guidance system (see FIG. 1).

The signal emitted from base transmitter antenna 36 is picked up by the airborne transponder 25 through its antenna 37. From antenna 37, the received signal passes through an R.F. amplifier 38, and then into a mixer 39 in which the received signal is mixed with a signal of different frequency from an oscillator 40. The output from mixer 39 is fed into a difference frequency amplifier 41, which amplifies and filters out of the signal the difference frequency between that of amplifier 38 and that of oscillator 40. The output from amplifier 41 is of a frequency different than the frequency received at antenna 37. From amplifier 41, the output signal is fed into a modulating buffer amplifier 42, in which the signal is modulated by an impressed oscillation fed into buffer amplifier 42 from an oscillator 43. This is desirably an A.M. modulation, and is of a frequency which is characteristic to the particular aircraft in question, to afford a means of identifying that particular aircraft at the ground stations. The oscillator 40 is preferably an F.M. oscillator, at radio frequency. From buffer amplifier 42, the generated signal is fed through an output amplifier to a transmitter antenna 45, which is preferably located at substantially the same location on the aircraft as is receiving antenna 37.

The signal transmitted from antenna 45 of the airborne transponder is received at the two receiver stations 15 and 16 through two antennas 46 located at the points 19 and 20 respectively. In FIG. 3, I have shown only one of these antennas 46, and only one of the associated receiver station circuits, it being assumed that the circuit at the other receiver station is identical. The signal received at 46 is first fed through an R.F. amplifier 47 which is capable of passing and amplifying a range of frequencies broad enough to include not only the basic transponder frequency $F_t$ (which is transmitted from transponder antenna 45 when the aircraft is stationary), but also all of the frequencies to which that frequency $F_t$ may be changed by doppler effects under any conditions which may actually be encountered. When the aircraft is moving toward the central or base transverse line or plane 21, as seen in FIG. 1, the doppler frequency $F_d$ is added to the basic transponder frequency $F_t$, so that the total frequencies received at the receiver stations may be represented as $F_t + F_d$. Similarly, when the aircraft is beyond plane 21, and is moving away from that plane or line, the frequencies received at the two receiver stations may be represented as $F_t - F_d$.

It is desirable to have at the receiver stations, and at the central station, two separate circuits for use when the aircraft is moving toward and away from the base line 21 respectively. These circuits are identical, and consequently I have represented in FIG. 3 only one of the circuits, specifically that associated with the $F_t - F_d$ signals.

To allow the use of two such separate circuits for approaching and receding aircraft, the output from R.F. amplifier 47 at each of the receiver stations is fed into two separate amplifying and filtering circuits 48 and 49, the first of which will pass only the $F_t - F_d$ signals (i.e., the frequencies which are less than $F_t$ due to receding movement of the aircraft), whereas the second amplifier and filter circuit 49 passes only the $F_t + F_d$ signals, which are produced when the aircraft is moving toward base line 21. These circuits 48 and 49 may include sharply tuned mechanical filters, which as is well known, are capable of very sharply cutting off the frequencies which are past a desired point, such as at the precise frequency of $F_t$.

The use of two separate circuits for approaching and receding aircraft allows the system to guide two separate aircraft along the single path 11 at the same time, one of the aircraft approaching base line 21 from starting point 12, while the other aircraft recedes from base line 21 toward destination point 13. To now describe the $F_t + F_d$ circuit in detail, the output from amplifier and filter 49 is first fed through an R.F. amplifier 50, and then may be fed into a mixer 51 within which the signal is mixed with an oscillation from voltage amplifier 31 of the base transmitter. This oscillation from the transmitter may be delivered to the receiver station 15 through a coaxial cable 52, or through an R.F. link if desired, but in either case the cable or link 52 going to receiver station 15 should correspond exactly in length with a similar cable or link going to the left receiver station 16. From mixer 51, the resulting intermediate frequency signal is fed into an I.F. amplifier 53, from which two separate outputs are taken to a band pass amplifier 54 and another amplifier 55. The band pass amplifier 54 is designed to pass the entire band represented by $F_t + F_d$, and from that amplifier the signal is fed into a demodulator represented at 155. This demodulater is of a type to remove from the signal the amplitude modulation which had been placed on the signal by oscillator 43 in the airborne transponder. Thus, the output from demodulator 155 varies only in accordance with variations in $F_t+F_d$, and does not carry the aircraft identification oscillation produced by oscillator 43 of the transponder. This output from demodulator 155 is fed through a coaxial cable or R.F. link 56 to the interferometer 26 at central station 14. The length of this coaxial cable 56 or other link corresponds exactly in electrical terms to the length of a similar link extending from the other receiver station 16 to the interferometer or wave coincidence circuit 26. The output from amplifier 55 is fed into a clipper amplifier 57 and also into a demodulator 58. The amplifier 57 is a highly tuned clipper amplifier which is tuned very precisely to the frequency which is fed into that amplifier from amplifier 55 when there is no doppler effect produced on the signal by reason of the movement of the aircraft. During movement of the aircraft along path 11, the only time when this no doppler situation occurs is when the craft is passing directly through the central transverse base plane or base line 21. Amplifier 57 is so tuned as to pass a signal therethrough only when the plane is thus travelling through plane 21, so that amplifier 57 produces an output only at that time. This output is fed to an indicator 59 which indicates to an operator the fact that the craft is passing central plane 21. The demodulator 58 is designed to separate out only the AM modulation which was applied to the transponder signal by oscillator 53. This AM modulation is then fed to an indicator 59, to actuate that device in a manner indicating to an operator which particular aircraft is at a certain instant travelling along the path 11 toward base line 21. As will be apparent, each different aircraft has a different characteristic modulating frequency produced by its oscillator 43, so that different indications are given at indicator 59 for all of the different aircraft which may be utilized in the system.

As has been previously mentioned, the waves delivered to the interferometer through the two lines 56 from the two receiver stations 15 and 16 are fed into the interferometer in opposition to one another, so that they tend to cancel out. This is represented in FIG. 2, in which the curve 2a represents the sine wave input to the interferometer from one of the receivers, while the curve 2b represents the inverted input from the other receiver. When the aircraft 10 is positioned within the desired vertical guidance plane 22, and is moving in a proper direction along that plane or path 11, the two input waves 2a and 2b cancel one another out very completely, so that the resultant output from the interferometer is at a zero level as represented in FIG. 2c. This is true because the electrical distances through which the two input signals travel before reaching the interferometer are exactly equal as long as the aircraft is on the proper guidance plane. More specifically, referring to FIG. 1, when the aircraft 10 is at the illustrated proper location, one of the wave form signals through the interferometer travels first from point 18 to apparatus 17 on the aircraft, then along line 60 to receiver station 15, and then along one of the lines 56 to the interferometer which is desirably located at point 18. Similarly, the other input to the interferometer passes first from point 18 to point 17, then along line 61 to receiver station 16, and then inwardly along the second of the lines 56 to the interferometer at 18. These two defined paths are exactly equal in length, and consequently the two inputs to the interferometer coincide exactly (though they are of course relatively inverted), so that the two inputs cancel out precisely and produce the resultant straight line zero output of FIG. 2c. This zero output indicates that the aircraft 10 is on the proper guidance plane, and therefore no corrective command is produced by the apparatus.

Assume now that the aircraft begins to deviate slightly from the proper guidance plane 11, and for example moves to the right in FIG. 1 to the location represented in broken lines at 17a. Such deviation of the craft from the guidance plane alters the paths along which the two signals to the opposite sides of the interferometer must pass, so that the electrical length of one path is greater than that of the other, with the result that the two input waves are no longer in exact coincidence, and therefore do not completely cancel one another out. More particularly, one of the signal paths extends from point 18 to point 17a, then to point 19, and then inwardly along one of the lines 56 to point 18. This defined path is substantially shorter than the other signal path, which extends from point 18 to point 17a, then to point 16, and then inwardly to point 18. By virtue of this shifting movement of the two input signals out of complete cancelling coincidence, the interferometer commences to have an input, which is utilized to initiate a corrective command tending to turn the craft back toward the guidance plane 11. For example, if the deviation is in a direction such that the wave of FIG. 2b moves to the right relative to the wave of FIG. 2a, then the interferometer output will take the wave form represented in FIG. 2d, in which the initial rise or movement of the current at 62, referred to herein as the "going wave," is in a positive direction. That is, this results in a positive going wave. If the deviation of the aircraft is in the other direction, so that curve 2a moves to the right relative to curve 2b, then a negative going wave or initial rise is produced as shown at 63 in FIG. 2e. In either case, the amplitude of the interferometer output shown in FIGS. 2d and 2e first increases progressively as the aircraft moves farther away from plane 11, and then decreases progressively until it ultimately reaches a point 64 or 65 at which the two waves again either cancel out completely, or at least reach a predetermined relatively small minimum resultant output resulting only from the relatively small non-cancelling effect which may be produced by the presence of different dopplers on the two interferometer inputs. These second cancellation points 64 and 65 are reached when the aircraft has deviated from the guidance plane 11 far enough to make the distance from point 17a to point 20 exactly one wave length longer than the distance from point 17a to point 19 (or vice versa). In this condition, the interferometer inputs are shifted relative to one another exactly one complete cycle, so that they do cancel effectively. If the aircraft then moves still farther out from plane 11, another positive or negative going wave 66 or 67 is formed, and the cycle is repeated until the craft reaches another point at which cancellation occurs, and at which the two wave paths to the interferometer differ in electrical length by exactly two wave lengths. Additional or continued movement of the aircraft away from plane 11 of course produces still further null or minimum points such as are shown at 64 and 65, each followed by a going wave of the type represented at 62, 63, 66 and 67. The present system utilizes the going waves for indicating which direction the aircraft has deviated from or returned toward plane 11, and the system utilizes the null points or minimum points as indications of the positioning of the craft at a particular instant.

If all of the points representing the first null location 64 of FIG. 2d are plotted on FIG. 1, they form the first hyperbolic curved line 23a shown to the left of path 11 in FIG. 1. Similarly, all of the points representing the second leftward null point or minimum point form when plotted the second of the hyperbolic curves to the left of the degenerate hyperbola 11. In the same way, all of the other hyperbolas to the left of path 11 in FIG. 1, and the hyperbolas to the right of path 11, represent null or minimum lines.

To now describe the data handling apparatus which utilizes the output from interferometer 26 to control command transmitter 27, the output from the interferometer is preferably fed to two bi-stable multivibrators 68 and 69 which are adapted to respond to the going waves 62, 63, 66 and 67 of FIGS. 2d and 2e, and which produce pulses corresponding to those going waves or rising waves. For example, the multivibrator 69 may be adapted to produce a first pulse, typically a square form D.C. pulse, when the aircraft has moved far enough to the left of line 11 to produce the first going wave or rise 62 of FIG. 2d. Similarly, a second pulse is produced when the movement of the aircraft reaches a point at which the second going wave 66 is formed. In this same manner each of the going waves produces a pulse in the output of the multivibrator 69. The time constant and other characteristics of the multivibrator are of such values that the multivibrator remains actuated from the time that the going waves starts a pulse until the next null or minimum point 64 is reached, so that only one pulse is formed for each going wave or rise 62, 66, etc. The second multivibrator 68 is operated the same as multivibrator 69, except that it responds to negative going waves of the type shown at 63 and 67 in FIG. 2e, rather than positive going waves. Also, multivibrator 68 produces negative D.C. pulses at its output, corresponding to the negative going waves, whereas multivibrator 69 produces positive D.C. pulses corresponding to the positive going waves.

The output pulses from the two multivibrators are fed into two pulse counters 70 and 71, with each of the multivibrators having an outlet line going to each of the pulse counters. Counter 70 is a negative pulse counter, which counts up from zero in correspondence with the negative pulses fed to it from multivibrator 68, and which will then count down and back to zero, but not below zero, for each positive pulse which is fed to that counter by multivibrator 69. The positive pulse counter 71 is just the opposite, in that it functions to count positive pulses from multivibrator 69 up from zero, and then counts back down to zero on negative pulses from multivibrator 68.

The negative pulse counter 70 controls an on-off oscillator 72, which is automatically turned on as long as there is any negative pulse count in counter 70. A second on-off oscillator 73 is automatically turned on by counter 71 as long as there is any positive pulse count on the latter. The frequencies of the two on-off oscillators are different, and are such as to inject into command transmitter two characteristic frequencies which are adapted to give left and right commands respectively to the aircraft. These command frequencies are impressed on the buffer modulator 74 of the command transmitter, whose primary carrier wave oscillator is represented at 75. The output from buffer modulator 74 is fed through a power amplifier 175 in the command transmitter before being conducted to transmitter antenna 76 which is located at the central point 18 of the system. The frequency transmitted from antenna 76 of course has a basic frequency which is different from the other transmitted frequencies of the system, with this basic carrier wave frequency being modulated by the oscillations of the two on-off oscillators 72 and 73. The signal transmitted from antenna 76 is received by the airborne guidance equipment 28 through an antenna 77 located directly adjacent antennas 37 and 45. This antenna 77 conducts the received signal into a conventional guidance receiver and control system 78 which controls the autopilot 79 to turn the aircraft to the right when oscillator 73 is on, and to turn it to the left when oscillator 72 is on.

As will be apparent from the foregoing, when there is a negative count of one on the pulse counter 70, this indicates that the aircraft has deviated from the guidance path 11 far enough to reach the first of the hyperbolic curved lines 23, the deviation in this case typically being to the right. A negative count of two indicates that the craft is on the second line to the left, etc. Similarly, a pulse count of one on counter 71 indicates that the craft is on (or has passed) the first curved hyperbolic line to the right of path 11, a pulse count of two indicates the second hyperbolic line, etc. When there is a count on either of the counters 70 or 71, the other counter is disabled against building up any type of count until the first count has been reduced back to zero, that is, until the aircraft has returned to the center guidance line 11.

This disabling effect is attained by including in the negative pulse counter 70 a unit for creating and applying to the positive pulse counter 71 (through line 103) a disabling control voltage whenever there is a negative count on counter 70. A similar voltage for disabling counter 70 is supplied by counter 71 through line 104 when there is a plus count.

In addition to affording the above discussed left and right guidance control, the apparatus of FIGS. 1 to 3 is also capable of continuously measuring very accurately the distance that the aircraft 10 has travelled from a particular starting point. This distance measurement can then be continuously transmitted back to the aircraft from central station 14, to be utilized by guidance receiver and control system 78 in automatically adjusting the altitude of the aircraft in accordance with a predetermined distance-altitude program which has been applied to the guidance receiver and control system before commencement of a particular flight. The guidance receiver and control system may include an altimeter 80, as shown, which coacts with the rest of the guidance equipment in properly regulating the altitude in accordance with the predetermined program, in response to the distance measurement information which is supplied to the craft from the command transmitter. This distance information is applied to the buffer modulator of the command transmitter by means of a third modulating oscillator 81, whose frequency is proportional to the distance that has been travelled from a particular starting point, such as the point 12 in FIG. 1.

The distance that the craft has travelled from this point 12 is measured by counting the doppler wave fronts produced by motion of the craft relative to base transmitter 14, and along path 11. More specifically, there is provided at the central station 14 a distance receiver 82, which has a pick-up antenna 83 at the point 18, and which receives the signal sent by airborne transponder 25. The frequency of the signal thus picked up is dependent upon the base frequency transmitted by base transmitter 24, as altered by the transponder, and as altered by the doppler effect produced by the relative motion of the plane. The radio frequency from receiver 82 is fed into a mixer 84, in which the signal is mixed with an oscillation from voltage amplifier 33, to produce an intermediate frequency which is amplified by an amplifier 85. A second intermediate frequency amplifier 86 amplifies the frequency from voltage amplifier 33, and the two outputs from amplifiers 85 and 86 are fed into a balanced demodulator 87 whose output is the pure doppler produced by motion of the aircraft, with the base frequency removed from the signal. To achieve this result, the intermediate frequencies of the two amplifiers 85 and 86 must be identical when the aircraft is not in motion. The doppler from balanced demodulator 87 is first passed through an amplifier 88, and then into a counter 89, which accurately counts the number of wave fronts of doppler which are developed. This doppler counter indicates precisely the distance that has been travelled by the aircraft. The output from the counter is used to control a distance voltage generator 90, which develops a voltage proportional to the distance that has been travelled from the starting point 12, which voltage is employed to control oscillator 81 to develop an oscillation frequency also proportional to the distance travelled. As has been previously mentioned the resulting oscillation frequency, which must at all times be different than the other two modulating frequencies from oscillators 72 and 73, is impressed on the buffer modulator of the command transmitter, to be transmitted from antenna 76 to the airborne guidance equipment. The guidance equipment on the aircraft may be a conventional tone guidance system, or any other conventional system, adapted to respond to the three modulations which have been impressed on the transmitted wave, to give right and left command signals, and to give distance information for use in controlling the programed altitude control equipment.

To now recapitulate briefly the FIGS. 1 to 3 guidance system, assume first that the aircraft is located at the position 12 on path 11, and that it is desired to guide the craft along path 11 toward base line or plane 21. As the craft is started in motion along path 11, both of the pulse counters 70 and 71 have zero counts thereon, so that both of the oscillators 72 and 73 are off, and no right or left command is being given. The guidance equipment on the plane is thus set to direct the plane in a straight line. Also, at the point 12, the doppler count at counter 89 is zero, indicating zero distance travelled from point 12, and the resultant oscillation frequency impressed on the command transmitter by oscillator 81 is at a level which represents zero distance and will be interpreted as such by the guidance equipment on the aircraft. When the craft is on path 11, the two waves fed into interferometer 26 from the two receiver stations are in exact coincidence, though relatively inverted, and therefore completely cancel one another out. If the craft then deviates from path 11, the two waves at the interferometer move out of coincidence, with the development of a resultant output at the interferometer corresponding to that of either FIG. 2d or FIG. 2e (depending on on the direction of deviation), so that the going waves 62 and 66, or 63 and 67, develop either a negative pulse count on counter 70, or a positive pulse count on counter 71 (also depending on the direction of deviation). If a negative pulse count is produced, the oscillator 72 is automatically turned on by that count, to impress on the command transmitter a modulation frequency which causes a proper corrective turn command to be received and carried out at the aircraft, typically a rightward turn back toward path 11 if the pulse count is negative. The reverse occurs if a positive pulse count is developed, to produce the opposite corrective command. When the corrective command has brought the craft back to path 11, the count will have been reduced back to zero on the proper counter 70 or 71, so that both counters are then at zero condition, and the craft is directed in a straight line along path 11. Thus, the apparatus automatically maintains the craft substantially on path 11 through its entire flight. During the travel from initial point 12, the doppler counter 89 is counting the doppler wave fronts produced by motion of the aircraft, to impress on the command transmitter an indication of the distance that has been travelled by the craft, for use by the altitude control apparatus on the aircraft, as previously discussed. During the times that the aircraft is travelling toward base line 21, the $F_t+F_d$ circuit of the two receiver stations, and the corresponding apparatus at the central station, is in use. When the craft passes the base line 21, the operator switches to the $F_t-F_d$ circuits, which are a duplication of the other circuits, to continue the guidance control of the aircraft. Thus, two craft may be controlled at the same time, at opposite sides of base line 21.

While the illustrated FIGS. 1 to 3 apparatus has typically been describe as utilizing continuous wave signals, it will be apparent that the same basic idea can be applied to transmitted signals of the D.C. pulse type. In either case, the signals from the two receiver stations are fed into some type of wave coincidence circuit or system, which responds to shifting movement of the two waves out of coincidence as a result of movement of the aircraft off of the main guidance plane. It will also be obvious that a craft may if desired be guided along any of the curved hyperbolic paths 23 by the present system, instead of the straight line path 11, since each of the curved hyperbolic paths, like the straight line path 11, represents a line along which the interferometer output is a null, or at least a minimum (with some effect under certain circumstances as a result of the unlike doppler which may be produced on the two received signals at stations 15 and 16 by virtue of different rates of movement of the aircraft relative to the two stations).

While the system may utilize components having frequencies of many different values, I will list below, in order to make certain that the present disclosure is complete enough, a series of frequency values which may be employed in a particular arrangement of the FIGS. 1 to 3 type:

(1) Oscillator 29 _____ 5 kc.
(2) Amplifier 30 output ____ 15 kc.
(3) Amplifier 34 and antenna 36 output _____ 100 mc./s.
(4) Oscillator 40 output_____ 60 mc./s.
(5) Difference frequency at amplifier 41 (basic wave emitted by transmitter 45) _____ 40 mc./s.
(6) Modulation frequency impressed by oscillator 43_____ 1000 c.p.s.
(7) Band width of R.F. amplifier 47 _____ 39 to 41 mc./s.
(8) Frequency band rejected by amplifier and filter 49___ 40 mc./s. and below.
(9) Frequency band rejected by amplifier and filter 48 40 mc./s. and above.
(10) Intermediate frequency at amplifier 53, and which is fed to wave coincidence circuit 26_____ 15 kc.+$F_d$.
(11) Oscillator 72 _____ 100 c.p.s.
(12) Oscillator 73 _____ 200 c.p.s.
(13) Oscillator 75 _____ 20 mc./s.
(14) Intermediate frequencies at amplifiers 85 and 86_____ 15 kc.
(15) Oscillator 81 _____ 1500 c.p.s. to 15,000 c.p.s.
(16) Antenna 76 _____ 200 mc./s.

FIG. 4 shows fragmentarily the circuit for a second form of guidance system, which is essentially the same as that of FIGS. 1–3 except that the signals fed to wave coincidence circuit 26a represent only the doppler received at the two receiver stations, rather than the composite signals received at those locations. Since the block diagram of this FIG. 4 guidance system is in most respects identical with that shown in FIG. 3, I have not duplicated in FIG. 4 of all of the FIG. 3 apparatus, but rather have shown only such units as are added in order to obtain the doppler controlled signals.

In FIG. 4, the equipment 14a at the central station may have a block diagram identical with that shown at 14 in FIG. 3; and the equipment 15a at each receiver station may have the same block diagram as is represented at 15 in FIG. 3. Similarly, the circuit of the airborne apparatus 17a may be as shown at 17 in FIG. 3. However, in addition to these various units there is also provided for each of the receiver stations a balanced discriminator 100, which functions as a doppler discriminator, and into which the signal from line 56a (corresponding to line 56 of FIG. 3) is fed. There is also fed into the discriminator 100 a signal taken from amplifier 30a of the base transmitter 24a (corresponding to amplifier 30 of FIG. 3), which signal may be amplified by an amplifier 101. The signals from amplifier 101 and line 56a have frequencies which are exactly equal to one another when the aircraft is motionless (no doppler effect). The discriminator 100 functions to beat these two input signals together, to produce an output in line 102 which represents, and varies in accordance with, only the doppler portion ($F_d$) of the signal received at the corresponding receiver station. The signals from the two lines 102 of the two receiver stations are fed into the interferometer or other wave coincidence circuit 26a, in opposition to one another, and normally cancel one another out (or substantially cancel out) when the aircraft is on guidance plane 11, or is offset one or more null points from that plane.

When the aircraft deviates either to the right or the left of central guidance plane 11 in FIG. 1 (with the doppler type guidance system of FIG. 4 in use), the resultant output from interferometer 26a has a wave configuration such as that shown in FIG. 2d or FIG. 2e, depending on the direction of deviation. The control apparatus at the central station and on the aircraft responds to this wave form in the same manner discussed in connection with FIG. 3, to count the number of null or minimum wave points through which the aircraft passes, and to automatically bring the craft back to the center plane 11.

It will be apparent in FIG. 4 that, in order to preserve the balance of the system, it is desirable that the two links or lines 102 from the two receiver stations be of exactly the same effective electrical length, to introduce identical delays into the two circuits. Also, the same is true of the two lines 56a, and the two lines between amplifiers 101 and discriminator 100. It is contemplated that discriminators 100 may be located either at the receiver stations or at the central station, as long as the lines associated therewith are balanced in effective length as mentioned. It will of course be understood that any or all of these various lines connected to discriminators 100 may be either coaxial cables or R-F links as desired.

I claim:

1. A system for automatically guiding a craft along a predetermined path comprising a transmitter to be carried by said craft and operable to transmit a signal having essentially a repeating wave form, two receivers positioned and constructed to receive said signal from the craft at opposite sides of said path, a wave coincidence system adapted to respond to relative displacement of two waves into and out of coincidence, means for feeding into said wave coincidence system two signals of repeating wave form controlled by the signals received by said two receivers respectively, a command transmitter, automatic control means automatically actuable by said wave coincidence system, in response to relative displacement of the waves of said two signals therein resulting from movement of the craft off of said path, to transmit a turn command to the craft in a direction to move the craft back toward said path, and turn controlling apparatus in said craft responsive to said transmitted command.

2. A system as recited in claim 1, in which said two receivers have their antennas positioned equal distances from said path at opposite sides thereof and on essentially a common plane extending transversely of said path.

3. A system as recited in claim 1, in which said first mentioned means feed into the wave coincidence system repeating wave signals which represent essentially the doppler produced by movement of the craft relative to said receivers.

4. A system as recited in claim 1, in which said first mentioned means feed into the wave coincidence system repeating wave signals whose frequencies are controlled by the composite signals received by said receivers, including the signal emitted from said transmitter as altered by doppler resulting from movement of the craft.

5. A system as recited in claim 1, in which said autoatic control means includes counter means operable to count the number of responses of said wave coincidence system as the waves of said two signals move alternately into and out of coincidence upon movement of the craft away from said path, said counter means then being operable to count back down to zero in accordance with the responses of said wave coincidence system resulting from movement of the craft back toward said path.

6. A system as recited in claim 5, in which there are two of said counter means for counting said responses upon left and right deviation respectively from said path, there being means for preventing each of said counter means from building up a count thereon if there is already a count present on the other counter means.

7. A system for automatically guiding a craft along a predetermined path comprising a transmitter to be carried by said craft and operable to transmit a signal having essentially a repeating wave form, two receivers positioned to receive said signal from the craft at opposite sides of said path, an interferometer, means for feeding into said interferometer in opposition to one another two signals of repeating wave form controlled by the signals received by said two receivers respectively, a command transmitter, automatic control means automatically actuable by the interferometer, in response to relative displacement of the waves of said opposed signals upon movement of the craft off of said path, to transmit a turn command to the craft in a direction to move the craft back toward said path, and turn controlling apparatus in said craft responsive to said transmitted command.

8. A system as recited in claim 7, in which said first mentioned means feed said opposed signals into the interferometer in a relation such that their waves cancel one another out to a maximum extent when the craft is on said path but are shifted to positions in which they cancel to a reduced extent when the craft leaves said path, said automatic control means being responsive to said relative shifting movement of the opposed waves to said positions of reduced cancellation to actuate said command transmitter to send a corrective turn command to the craft.

9. A system as recited in claim 7, in which said first mentioned means feed said opposed signals into the interferometer in a relation such that their waves cancel one another out to a maximum extent when the craft is on said path but are shifted to positions in which they cancel to a reduced extent when the craft leaves said path, said interferometer being constructed to produce a going wave in a first direction when the craft moves to a first side of said path, and to produce an opposite going wave when the craft moves to a second side of the path, said control means including means responsive to said first mentioned going wave to actuate the command transmitter to turn the craft in said second direction back toward the path, and responsive to said opposite going wave to actuate the command transmitter to turn the craft in said first direction back toward the path.

10. A system as recited in claim 9, in which said automatic control means include counter means operable to count said going waves produced upon outward movement of the craft in either of said directions from the path, and operable to then count the reverse going waves during return of the craft toward said path, and means actuated by a first of said going waves when the craft leaves the path to disable the control means and command transmitter from giving a turn command in an improper one of said directions until the returning going waves have been counted to a number equaling the going waves produced during outward movement of the craft.

11. A system for automatically guiding a craft along a predetermined path comprising a first transmitter at a predetermined location on the earth and operable to transmit a signal having a repeating wave form, a transponder on said craft operable to receive said signal as varied by doppler and to transmit a second signal whose frequency is controlled by said first signal as received, two receivers having their antennas positioned and constructed to receive said second signal as varied by doppler at predetermined locations relative to the earth and at opposite sides of said path, a wave coincidence system adapted to respond to relative displacement of two waves into and out of coincidence, means for feeding into said wave coincidence system two signals of repeating wave form controlled by the signals received by said two receivers respectively, a command transmitter, automatic control means automatically actuable by said wave coincidence system, in response to relative displacement of the waves of said two signals therein upon movement of the craft off of said path, to transmit a turn command to the craft in a direction to move the craft back toward said path, and turn controlling apparatus in said craft responsive to said transmitted command.

12. A system as recited in claim 11, in which said two receivers have their antennas positioned equal distances from said path at opposite sides thereof and on essentially a common plane extending transversely of said path.

13. A system as recited in claim 11, in which said path in plan view is a degenerate hyperbola extending midway between said two receivers and having its foci at the locations of the antennas of said receivers, said first transmitter having its antenna located along said degenerate hyperbola.

14. A system for automatically guiding a craft along a predetermined path comprising a first transmitter at a predetermined location on the earth and operable to transmit a signal having a repeating wave form, a transponder on said craft operable to receive said signal as varied by doppler and to transmit a second signal whose frequency is controlled by said first signal as received, two receivers having their antennas positioned to receive said second signal as varied by doppler at predetermined locations relative to the earth and at opposite sides of said path, an interferometer, means for feeding into said interferometer in opposition to one another two signals of repeating wave form controlled by the signals received by said two receivers respectively, said means feeding said opposed signals into the interferometer in a relation such that their waves cancel one another out to a maximum extent when the craft is on said path but are shifted to positions in which they cancel to a reduced extent when the craft leaves said path, a command transmitter, automatic control means automatically actuable by the interferometer, in response to said relative displacement of the opposed waves to said positions of reduced cancellation, upon movement of the craft off of said path, to actuate the command transmitter to send a turn command to the craft in a direction to move the craft back toward said path, and turn controlling apparatus in said craft responsive to said transmitted command.

15. A system as recited in claim 14, in which said interferometer is constructed to produce a going wave in a first direction when the craft moves to a first side of said path, and to produce an opposite going wave when the craft moves to a second side of the path, said control means including means responsive to said first mentioned going wave to actuate the command transmitter to turn the craft in said second direction back toward the path, and responsive to said opposite going wave to actuate the command transmitter to turn the craft in said first direction back toward the path.

16. A system as recited in claim 15, in which said automatic control means include counter means operable to count said going waves produced upon outward movement of the craft in either of said directions from the path, and operable to then count the reverse going waves during return of the craft toward said path, and means actuated by a first of said going waves when the craft leaves the path to disable the control means and command transmitter from giving a turn command in an improper one of said directions until the returning going waves have been counted to a number equaling the going waves produced during outward movement of the craft.

17. A system as recited in claim 11, in which said first mentioned means include means for beating a signal controlled by said first transmitter against signals controlled by said two receivers respectively in a relation to feed to the interferometer opposed signals representing essentially the doppler produced in the signals received at the two receivers by motion of the craft.

18. A ground apparatus system for automatically guiding along a predetermined path a craft which carries remote electromagnetic wave operated guidance equipment and a transmitter operable to transmit a signal of repeating wave form; said apparatus comprising two receivers positioned to receive said signal from the craft at opposite sides of said path, a wave coincidence system adapted to respond to relative displacement of two waves into and out of coincidence, means for feeding into said wave coincidence system two signals of repeating wave form controlled by the signals received by said two receivers respectively, a command transmitter, and automatic control means automatically actuable by said wave coincidence system, in response to relative displacement of the waves of said two signals therein resulting from movement of the craft off of said path, to transmit a turn command to the craft in a direction to move the craft back toward said path.

19. A system as recited in claim 18, in which said wave coincidence system is an interferometer into which said opposed signals are fed in a relation such that their waves cancel one another out to a maximum extent when the craft is on said path but are shifted to positions in which they cancel to a reduced extent when the craft leaves said path, said automatic control means being responsive to said relative shifting movement of the opposed waves to said positions of reduced cancellation to actuate said command transmitter to send a corrective turn command to the craft.

20. A ground apparatus system for automatically guiding along a predetermined path a craft which carries radio operated guidance equipment and a transponder; said apparatus comprising a first transmitter at a predetermined location on the earth and operable to transmit a repeating wave signal to be received by said transponder, two receivers for receiving said signal and having their antennas positioned to receive said second signal as varied by doppler at predetermined locations relative to the earth and at opposite sides of said path, a wave coincidence system adapted to respond to relative displacement of two waves into and out of coincidence, means for feeding into said wave coincidence system two signals of repeating wave form controlled by the signals received by said two receivers respectively, a command transmitter, and automatic control means automatically actuable by the wave coincidence system, in response to relative displacement of the waves of said signals therein upon movement of the craft off of said path, to transmit a turn command to the craft in a direction to move the craft back toward said path.

21. A system as recited in claim 20, in which said wave coincidence system is an interferometer into which said opposed signals are fed in a relation such that their waves cancel one another out to a maximum extent when the craft is on said path but are shifted to positions in which they cancel to a reduced extent when the craft leaves said path, said automatic control means being responsive to said relative shifting movement of the opposed waves to said positions of reduced cancellation to actuate said command transmitter to send a corrective turn command to the craft, said interferometer being constructed to produce a going wave in a first direction when the craft moves to a first side of said path, and to produce an opposite going wave when the craft moves to a second side of the path, said control means including means responsive to said first mentioned going wave to actuate the command transmitter to turn the craft in said second direction back toward the path, and responsive to said opposite going wave to actuate the command transmitter to turn the craft in said first direction back toward the path.

22. A system for use with an object moving along a path, comprising a first transmitter at a predetermined location and operable to transmit a signal having a repeating wave form, a transponder moving with said object and operable to receive said signal and to transmit a second signal whose frequency is controlled by said first signal as received, two receivers having their antennas positioned and constructed to receive said second signal at predetermined locations at opposite sides of said path, a wave coincidence system adapted to respond to relative displacement of two waves into and out of coincidence, means for feeding into said wave coincidence system two signals of repeating wave form controlled by the signals received by said two receivers respectively, and counter means operable to count the number of responses of said wave coincidence system as the waves of said two signals move alternately into and out of coincidence upon movement of said object away from said path, said counter means then being operable to count back down to zero in accordance with the response of said wave coincidence system resulting from movement of the object back toward said path.

23. A system for use with an object moving along a path, comprising a first transmitter at a predetermined location and operable to transmit a signal having a repeating wave form, a transponder moving with said object and operable to receive said signal and to transmit a second signal whose frequency is controlled by said first signal as received, two receivers having their antennas positioned and constructed to receive said second signal at predetermined locations at opposite sides of said path, a wave coincidence system adapted to respond to relative displacement of two waves into and out of coincidence, means for feeding into said wave coincidence system two signals of repeating wave form controlled by the signals received by said two receivers respectively, said wave coincidence system being an interferometer constructed to produce a going wave in a first direction when said object moves to a first side of said path, and to produce an opposite going wave when the object moves to a second side of the path, said system including means automatically responsive differently to said two going waves respectively.

24. A system for use with an object moving along a path, comprising a first transmitter at a predetermined location and operable to transmit a signal having a repeating wave form, a transponder moving with said object and operable to receive said signal and to transmit a second signal of repeating wave form whose frequency is controlled by said first signal as received, two receivers having their antennas positioned and constructed to receive said second signal at predetermined locations at opposite sides of said path, a wave coincidence system adapted to respond to relative displacement of two waves of repeating wave form into and out of coincidence in a plurality of different coincident settings of the two waves, and means for feeding into said wave coincidence system two signals of repeating wave form controlled by the signals received by said two receivers respectively and acting to cause response of said wave coincidence system at said plurality of different coincident settings of the two signals fed thereinto in response to movement of said object laterally of said path.

25. A system as recited in claim 24, in which said two receivers have their antennas positioned equal distances from said path at opposite sides thereof and on essentially a common plane extending transversely of said path.

References Cited in the file of this patent
UNITED STATES PATENTS

| | | |
|---|---|---|
| 1,406,996 | Morrill | Feb. 21, 1922 |
| 2,441,956 | Deloraine | May 25, 1948 |
| 2,597,349 | Longmire | May 20, 1952 |
| 2,811,325 | Adkisson | Oct. 29, 1957 |
| 2,821,704 | O'Day | Jan. 28, 1958 |
| 2,855,595 | Koeppel | Oct. 7, 1958 |